A. D. SCHAEFFER.
PAPER BOX.
No. 192,530. Patented June 26, 1877.
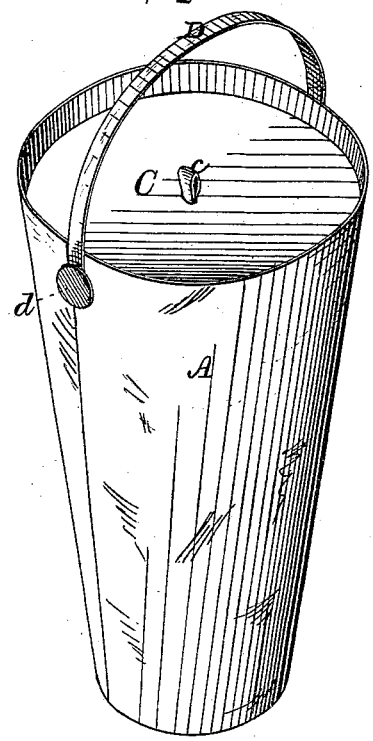
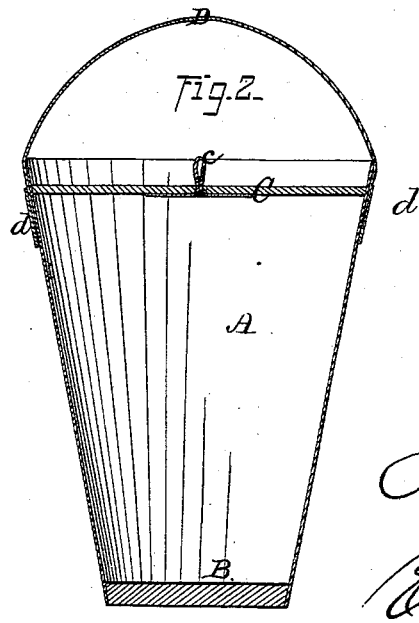
WITNESSES
Jas. B. Hutchinson.
Thos. Mister.
Arthur D. Schaeffer
INVENTOR
Edson Bro's
ATTORNEYS

UNITED STATES PATENT OFFICE.

ARTHUR D. SCHAEFFER, OF DAYTON, OHIO.

IMPROVEMENT IN PAPER BOXES.

Specification forming part of Letters Patent No. 192,530, dated June 26, 1877; application filed June 11, 1877.

*To all whom it may concern:*

Be it known that I, ARTHUR D. SCHAEFFER, of Dayton, in the county of Montgomery and State of Ohio, have invented certain new and useful Improvements in Ice-Cream Bucket or Receptacle; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a perspective view of my improved ice-cream or other bucket, and Fig. 2 is a vertical section thereof.

Corresponding parts in the two figures are denoted by like letters.

This invention relates to certain improvements in ice-cream or other buckets or receptacles, the object of which is to render the receptacle to a great extent air-tight, to enable the receptacle itself to serve as a mold, to simplify its construction, and to remove its molded contents without disturbing the shape of the latter; and it consists in constructing a paper receptacle in a tapering or conical and cylindrical form, and in fastening the bail or handle made from some textile material to said receptacle, substantially as hereinafter more fully set forth and claimed.

In the annexed drawing, A refers to a receptacle or bucket, made in a conical and cylindrical form, by which it will be observed that the bottom and top or cover can be wedged in position simply upon their insertion therein under a slight amount of pressure. This facilitates and simplifies its manufacture, and, consequently, makes it cheap, &c.

B is the bottom, which may be made of wood covered with paper, and glued, or otherwise further fastened in place. C is the top or cover, which is provided with a tape or loop, c, or other means for lifting it out of its place in the receptacle or bucket. D is a bail or handle, which may be made from some textile material, and is fastened or connected to the receptacle or bucket A by disks or slips d, glued, or pasted, or otherwise fastened over and to the ends of the said bail or handle, and to the said receptacle or bucket.

By this construction it will also be observed that the stamping or cutting of the receptacle with overlapping portions to serve for a cover, one of which is slitted to receive the other, is obviated, simplifying the receptacle and lessening expense.

It will be further observed that as the contents or cream of the bucket or receptacle naturally partakes of its shape, it, the bucket, will serve as a mold, as would be clearly obvious upon inverting the bucket with and lifting it from its contents or cream, leaving the same standing in the form of a cone, giving it a symmetrical appearance.

By this construction the removal of the molded form of the contents of the bucket will not be disturbed, there being no angles to break the contents as the same pass out of the receptacle or bucket.

Having thus described my invention, what I claim, and desire to secure by Letters Patent, is—

As a new article of manufacture, the conical and cylindrical paper receptacle A, having the textile bail or handle D attached thereto by the glued or pasted disks or strips d, the bottom B, with or without a paper lining, and top or cover C, both being adapted to be wedged in place in said receptacle A, substantially as shown and described.

In testimony whereof I have hereunto subscribed my name in the presence of two attending witnesses.

ARTHUR D. SCHAEFFER.

Witnesses:
CHRIS. PAULSON,
WM. H. BUSSARD.